Figure 1:
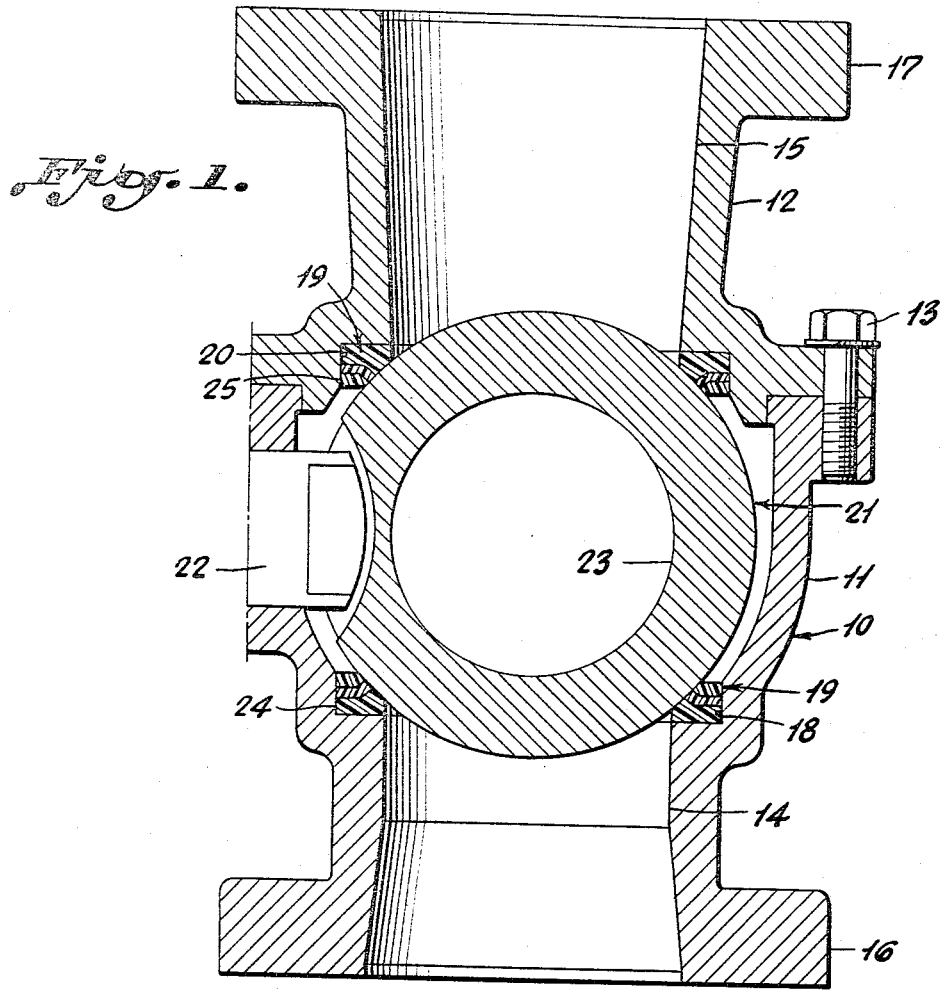

July 18, 1967  R. S. FORD  3,331,582
VALVE PACKING RING

Filed Feb. 17, 1965

2 Sheets-Sheet 1

INVENTOR
R. S. FORD

BY *Glascock, Downing & Seebold*

ATTORNEYS

July 18, 1967 — R. S. FORD — 3,331,582
VALVE PACKING RING
Filed Feb. 17, 1965 — 2 Sheets-Sheet 2

INVENTOR
R. S. FORD
BY Glascock, Downing & Seebold
ATTORNEYS

United States Patent Office 3,331,582
Patented July 18, 1967

3,331,582
VALVE PACKING RING
Robert S. Ford, Pascagoula, Miss., assignor to Ingalls Shipbuilding Corporation, Pascagoula, Miss.
Filed Feb. 17, 1965, Ser. No. 433,400
4 Claims. (Cl. 251—317)

This invention relates to fluid distribution and more particularly to a valve packing ring primarily for use in a conventional ball valve and also to a method of making such packing ring.

Ball valves have been in use for many years and such valves commonly include a body having a passage therethrough and a ball valve member rotatably disposed in the body between suitable sealing rings. The ball valve member is provided with a passage therethrough and such member may be rotated to align the passage with the passage through the body in order to provide for flow of fluid therethrough or rotated to a position out of alignment with the passage through the body to prevent the flow of fluid therethrough. The chief difficulty with this type of valve has been in connection with the sealing or packing rings, in that in order to provide for proper operation of the valve, it was necessary to accurately fit such rings in each valve and furthermore, this accurate fit was frequently destroyed by subsequent swelling of the packing rings with the result that the same engaged the ball with such force that convenient operation thereof was impossible. On the other hand, unless the packing rings were very accurately fitted, leakage frequently occurred due to insufficient sealing engagement between the packing rings and the ball and also leakage frequently occurred due to scoring of the packing rings. Needless to say the cost of manufacture of such ball valves was materially increased by the necessity for accurate precision fitting of the packing rings and furthermore, maintenance costs and loss of operating time have been materially increased by the inadequacies of the previous utilized packing rings in valves of this type.

It is accordingly an object of the invention to provide a packing ring for a ball valve, which packing ring will provide an adequate bearing support for the ball valve member and also provide for adequate sealing to prevent leakage of fluid.

A further object of the invention is the provision of a packing ring for a ball valve, such packing ring being of three-ply construction and constituted by three rings bonded together as a single unit with the outer rings being of relatively hard material to provide bearings for the ball valve member and the intermediate rings being of relatively soft material to provide sealing engagement with the ball valve member to prevent leakage of fluid.

A still further object of the invention is the provision of a packing ring for a ball valve, the packing ring comprising a first ring of relatively hard polyurethane, a second ring of relatively soft polyurethane bonded and a third ring of polyurethane substantially having the same hardness characteristic as the first ring and bonded to the second ring to provide a unitary structure, the first and third rings providing supporting bearings for the ball valve member and the second ring engaging the ball valve member to provide a seal and prevent leakage of fluids.

Another object of the invention is the provision of a packing ring for ball valves, such ring being disposed in an annular recess of the valve body and comprising a first ring of relatively hard plastic material, a second ring of relatively soft plastic material bonded to the first ring and a third ring having substantially the same hardness characteristics as the first ring and bonded to the second ring, the outer periphery of the rings being cylindrical for reception in the annular recess in the valve body and the inner peripheral surfaces of the first and third rings being spherical to provide bearing surfaces for engagement with the ball valve member the second ring projecting slightly outwardly of the cylindrical outer peripheral surface and having a rounded contour to engage and seal against a wall of the annular recess in the valve body and the inner edge of the second ring projecting slightly outwardly of the spherical surface at substantially right angles to a tangent thereto and having a rounded contour for engaging the ball valve member to provide a seal and prevent leakage of fluid.

A further object of the invention is the provision of a packing ring for ball valves, which packing ring is disposed in an annular recess in the valve body, the construction of the packing ring being such as to preclude the necessity of providing an accurate and close fit for the packing ring in the annular recess of the valve body while still providing for a suitable seal between the ring and the valve body and also providing suitable support and sealing engagement with the ball valve member.

A still further object of the invention is the provision of a packing ring for ball valves, the construction of such ring providing an adequate seal between the ball valve member and the ring and between the ring and the valve body and at the same time, providing for relatively free movement of the ball valve member and eliminating jamming thereof due to swelling or distortion of the packing ring, the construction of such packing ring also providing for rapid and convenient replacement thereof when necessary.

Another object of the invention is the provision of a method for making a packing ring for ball valves, such packing ring comprising a first ring of relatively hard polyurethane, a second ring of relatively soft polyurethane bonded to the first ring and a third ring of polyurethane having substantially the same hardness characteristic as the first ring and bonded to the second ring, such method including the casting of the first ring allowing the same to partially set the casting of the second ring in direct contact with the first ring and allowing the second ring to partially set and bond to the first ring, casting the third ring in direct contact with the second ring to bond the same thereto allowing the composite ring to completely set and thereafter trimming excess material therefrom and finally finishing the ring to proper dimensions and shape, including a spherical inner surface on the first and third rings, a cylindrical outer surface on the first and third rings and a rounded surface on inner and outer edges of the second ring with such rounded surfaces projecting slightly from the inner spherical surface and from the outer cylindrical surface of the ring.

Figure 2:
Figure 3:
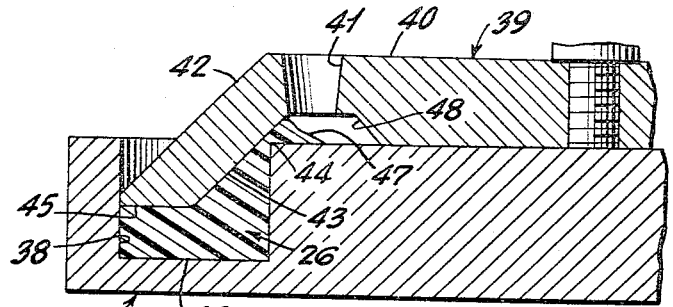
Figure 4:
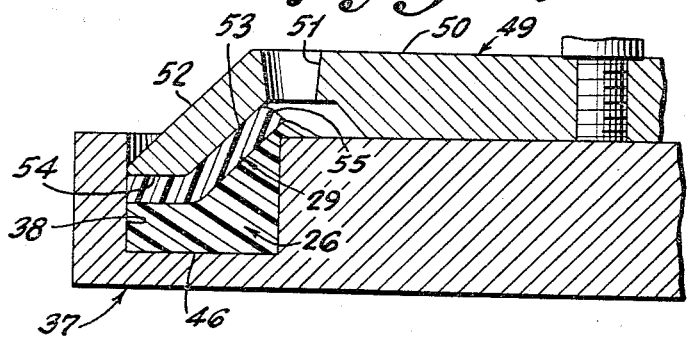
Figure 5:
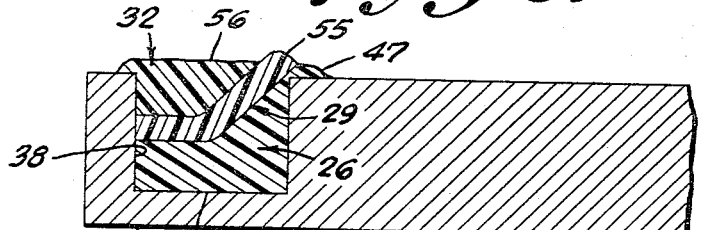

Further objects and advantages of the invention will be apparent from the following description taken in conjunction with the accompanying drawings wherein:

FIG. 1 is a longitudinal sectional view through a conventional ball valve and showing the packing ring of this invention installed therein;

FIG. 2 a transverse sectional view of a packing ring constructed in accordance with this invention;

FIG. 3 a fragmentary sectional view showing the first step in the method of making the packing ring of this invention;

FIG. 4 a fragmentary sectional view, similar to FIG. 3 and showing the second step of the method;

FIG. 5 a fragmentary sectional view showing the third step of the method; and

Figure 6:
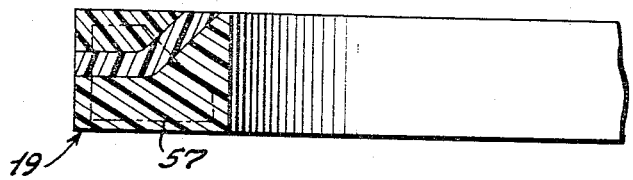

FIG. 6 a fragmentary transverse sectional view showing the completed packing ring prior to finishing of the same to final dimensions and shape.

With continued reference to the drawings, there is shown in FIG. 1 a more or less conventional ball valve comprising a valve body 10 composed of two parts 11 and 12 with the part 12 being removably secured to the part 11 by suitable screw threaded fastening means 13. The parts 11 and 12 are provided with aligned fluid passages 14 and 15 and flanges 16 and 17 are provided on the parts 11 and 12 to permit securing the valve to opposed ends of a conduit as is conventional with this type of valve.

The part 11 is provided with an annular recess 18 for receiving the packing ring 19 and the part 12 is provided with a similar annular recess 20 for receiving an identical packing ring 19. Disposed between the packing rings 19 in the body parts 11 and 12 is a ball valve member 21 provided with a suitable stem 22 for rotating the same and the valve member 21 is provided with a passage 23 therethrough which, when in alignment with the passages 14 and 15 in the valve body 10, permit the flow of fluid therethrough and when positioned at right angles to the passages 14 and 15, prevents the flow of fluid through the valve body 10. The ball valve member 21 is rotatably supported in the valve body 10 by the packing rings 19 and these packing rings also provide a sealing engagement with the ball valve member 21 and also with the outer walls 24 and 25 of the annular recesses 18 and 20 in the parts 11 and 12 of the valve body 10.

The ball valve shown in FIG. 1 is for illustrative purposes only and it will be understood that other types of ball valves may be utilized with the packing ring of this invention and the particular advantages of this packing ring may be utilized in connection with various specific types of ball valves.

With particular reference to FIG. 2 the packing ring 19 of this invention comprises a first ring 26 of relatively hard polyurethane which may have a hardness characteristic of 75D shore and the ring 26 is provided with an outer cylindrical surface 27 of a diameter to easily fit within the annular recesses 18 and 20 of the valve body parts 11 and 12. The major inner peripheral surface 28 of the ring 26 is spherical and is complementary to the spherical outer surface of the ball valve member 21.

A second ring 29 of relatively soft polyurethane having a hardness characteristic, for example of 90A shore is bonded to the first ring 26 and it is to be noted that the second ring 29 has a portion 30 disposed at substantially right angles to a tangent to the cylindrical surface 27 of the first ring 26 and also has a second inner portion 31 disposed at substantially right angles to a tangent to the spherical surface 28 of the first ring 26.

A third ring 32 of relatively hard polyurethane having a hardness characteristic of 75D shore, or in other words, the same hardness characteristic as the first ring 26 is bonded to the second ring 29 and the third ring 32 is provided with an outer cylindrical peripheral surface 33 of the same diameter as the surface 27 of the first ring 26 and the inner peripheral surface 34 of the third ring 32 is spherical and complementary to the outer spherical surface of the ball valve member 21.

The outer edge 35 of the second ring 29 projects slightly outwardly of the cylindrical surfaces 27 and 33 of the first and third rings 26 and 32 and this outer edge 35 is rounded as clearly shown in FIG. 2. In a similar manner, the inner edge 36 of the second ring 29 projects inwardly of the spherical surfaces 28 and 34 on the first and third rings 26 and 32 and this inner edge 36 is also slightly rounded for a purpose to be presently described.

There is, thus, provided a three-ply composite unitary packing ring which may be conveniently installed in the annular recesses 18 and 20 of the valve body parts 11 and 12 with the ball valve member 21 disposed therebetween and upon securing the valve body parts 12 to the body part 11, the inner rounded edges 36 of the second rings 29 of the packing rings 19 will engage the ball valve member 21 and be compressed to provide a sealing engagement therebetween and at the same time, the outer rounded edges 35 of the second ring 29 will engage the walls 24 and 25 of the annular recesses 18 and 20 to provide a sealing engagement therebetween, thereby precluding the necessity for the cylindrical surfaces 27 and 33 of the rings 26 and 32 having a tight fit with the walls of the annular recesses 18 and 20. The spherical surfaces 28 and 34 on the first and third rings 26 and 32 provide bearing surfaces for the ball valve member 21 and adequately support the same for relatively free rotation while the relatively soft second ring 29 provides the sealing engagement with the ball valve member 21 to prevent leakage of fluid and furthermore, by reason of the fact that the inner edge 36 of the second ring 29 engages the outer surface of the ball valve member at substantially right angles to a tangent thereto, there will be no so-called "Squeegee action" which would result in excessive wear of the second ring 29 at the edges thereof engaging the ball and, therefore, increased life is provided, together with superior sealing characteristics and furthermore, pressure exerted by the ball valve member 21 when in closed position against the bearing rings 26 and 32 tend to compress the second ring 29 to provide an increased sealing engagement, both with the valve member 21 and with the walls of the annular recesses in the valve body 10. This construction also serves to eliminate feather edges at the bonded joints thus avoiding a source of wear.

It has been found that by reason of the use of the compressible and flowable second ring 29 which provides the sealing engagement, that binding of the valve member 21 due to swelling or distortion of the packing ring is substantially prevented, since the flow of such second ring 29 compensates for such swelling or distortion and consequently relatively free movement of the valve member 21 is possible at all times and at the same time adequate sealing against fluid leakage is provided.

With particular reference to FIGS. 3 to 6, there is shown a method of making the packing ring of this invention and with particular reference to FIG. 3, there is shown a bottom mold member 37 having an annular upwardly opening groove 38 of rectangular cross section therein. A top mold member 39 is removably positioned on the bottom mold member 37 and the top mold member 39 comprises a plate 40 having one or more vent openings 41 therein and also provided with an angularly disposed annular flange 42 projecting downwardly into the annular groove 38 with the inner inclined edge 44 of the groove 38 and with the lower edge 45 of the flange 42 spaced above the bottom 46 of the anular groove 38. The annular groove 38 below the flange 42 is filled with polyurethane having a hardness characteristic of 75D shore to a level above the inner edge 44 of the annular groove 38 as shown at 47 with the excess material being received in a recess 48 in the lower surface of the top mold member 39. This serves to cast the first ring 26 which is allowed to partially set and the top mold member 39 is then removed.

A second top mold member 49 comprises a plate 50 having one or more vent holes 51 therein is provided with an angularly disposed downwardly extending flange 52 which is shorter than the flange 42 of the first top mold member 39 and the second top mold member 49 is positioned on the bottom mold member 37 in a similar manner with the inner surface 53 of the flange 52 spaced from the first ring 26 and with the lower edge 54 of the flange 52 also spaced from the first ring 26. Thereafter, polyurethane having a hardness characteristic of, for instance, 90A shore is poured into the space between the flange 52 and the first ring 26 to a level substantially equal to the excess material at the upper edge of the first ring 26 as shown at 55, and this serves to catch the second ring 29 which is then allowed to partially set and bond to the first ring 26 after which the second top mold member 49 is removed.

Polyurethane of a hardness characteristic of, for instance 75D shore or of the same hardness characteristic as the first ring 26 is poured into the annular groove 38 above the second ring 29 to a level of above the upper edge of the annular groove 38 and this serves to cast the third ring 32 which, as clearly shown in FIG. 5, has an excess of material indicated at 56 above the bottom mold member 37. The entire packing ring comprising the first ring 26, second ring 29 and third ring 32 is allowed to set and bond together to provide a unitary composite structure and is thereafter removed from the bottom mold member 37 and the excess plastic material 47, 55 and 56 trimmed therefrom to provide the packing ring 19 as shown in FIG. 6 having a substantially rectangular cross section.

Thereafter and prior to installation in a ball valve, the packing ring 19 is machined to finished dimensions or to the dotted outline 57 shown in FIG. 6 and, of course, the dimensions of this dotted outline may be changed in accordance with the particular ball valve in which the packing ring is to be installed.

While there may be other methods of making the packing ring of this invention, the method described above has proved particularly convenient and economical and has resulted in providing a packing ring having the advantageous characteristics of this invention and one which may be manufactured in relatively large production quantities. Also, if desired, elastomeric materials other than polyurethane may be employed.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A packing ring for use in a ball valve including a body, said body having spaced packing rings and a ball valve member rotatably disposed within said body between said recesses, said packing ring being of three ply construction and comprising a first ring of relatively hard plastic material having a flat radial face on one end, a cylindrical outer peripheral surface, a spherical inner peripheral surface, and a flat radial surface on the opposite end extending from said cylindrical surface to a point intermediate said outer and inner peripheral surfaces and terminating in an angular face extending to said spherical inner peripheral surface at substantially right angles to a tangent to said spherical surface, a second ring of relatively soft plastic material bonded to the radial surface on the opposite end of said first ring and to said angular face, and a third ring of relatively hard plastic material having a flat radial face on one end, a cylindrical outer peripheral surface, a spherical inner peripheral surface and a flat radial surface on the opposite end extending from the cylindrical surface on said third ring to a point intermediate said outer and inner peripheral surfaces on said third ring and terminating in an angular face extending to said spherical inner peripheral surface on said third ring at substantially right angles to a tangent to said last mentioned spherical surface, said radial surface and said angular face on the opposite end of said third ring being bonded to said second ring, the outer edge of said second ring having a rounded surface projecting outwardly of the outer peripheral surfaces of said first and third rings and the inner edge having a rounded surface projecting inwardly of the spherical inner peripheral surfaces of said first and third rings, whereby with said packing rings disposed in the annular recesses of the valve body, said spherical inner peripheral surfaces will engage the ball valve member to provide bearing surfaces and the rounded surfaces on the inner and outer edges of said second ring will engage the surface of the ball valve member and a wall of the recesses and be compressed to provide a seal, the portion of said second ring between said angular faces being disposed at substantially right angles to a tangent to the surface of said ball valve member.

2. A packing ring as defined in claim 1 in which said first, second and third rings are formed of polyurethane.

3. A packaging ring as defined in claim 2, in which said first and third rings have a hardness of 75D shore and said second ring a hardness of 90A shore.

4. A packing ring for use in a ball valve including a body, said body having spaced opposed annular recesses for receiving packing rings and a ball valve member rotatably disposed within said body between said recesses, said packing ring being of three ply construction and comprising a first ring of relatively hard plastic material, a second ring of relatively soft plastic material, and a third ring of relatively hard plastic material, said rings being bonded together to provide a unitary structure, said first and third rings having a cylindrical outer peripheral surface and a spherical inner peripheral surface, said second ring projecting outwardly of said outer peripheral surface and inwardly of said spherical surface at substantially right angles to a tangent to said spherical surface, whereby with said packing rings disposed in the annular recesses of the valve body, said spherical surfaces will engage the ball valve member to provide bearing surfaces, the projecting portions of said second ring engaging the surface of the ball valve member and a wall of the recesses and be compressed to provide a seal.

References Cited

UNITED STATES PATENTS

| | | | |
|---|---|---|---|
| 2,700,528 | 1/1955 | Blackman | 251—317 |
| 3,174,495 | 3/1965 | Anderson | 251—317 |

FOREIGN PATENTS

| | | |
|---|---|---|
| 826,214 | 1959 | Great Britain. |

M. CARY NELSON, *Primary Examiner.*

M. O. STURM, *Assistant Examiner.*